March 14, 1950            G. L. WILLIAMS            2,500,393
POWER TRANSMITTING DEVICE
Filed April 14, 1944
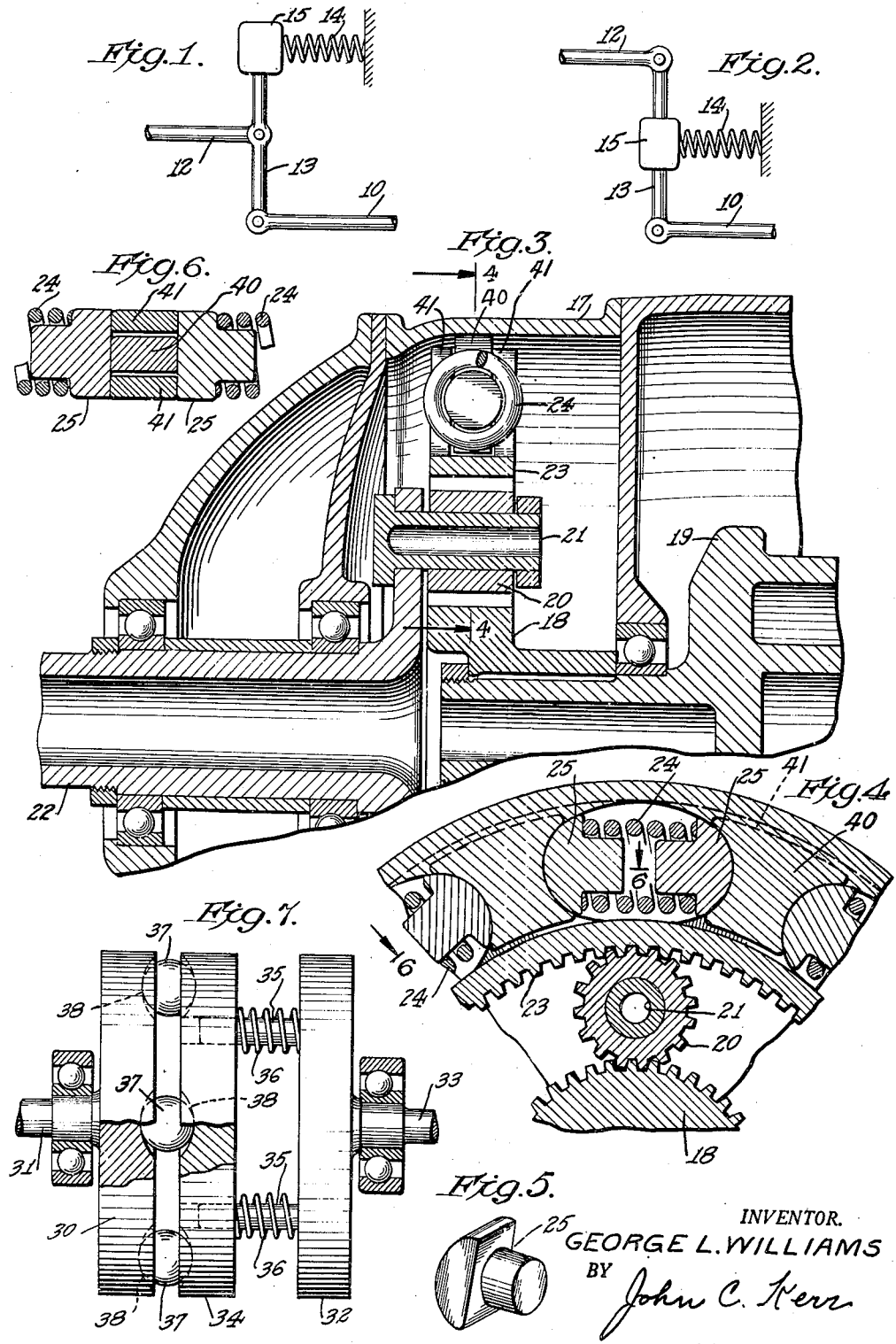
INVENTOR.
GEORGE L. WILLIAMS
BY John C. Kerr
ATTORNEY Patented Mar. 14, 1950

2,500,393

UNITED STATES PATENT OFFICE 2,500,393

POWER-TRANSMITTING DEVICE

George L. Williams, Manchester, Conn., assignor to United Aircraft Corporation, East Hartford, Conn., a corporation of Delaware Application April 14, 1944, Serial No. 530,990

2 Claims. (Cl. 74—801)

This invention relates to power transmitting devices and has for its object to provide a novel and improved device of this type in which the transmission of parasitic impulses or vibrations from a driving member to a driven member is greatly reduced or eliminated.

Another object of the invention is to provide a power transmitting mechanism including a mechanical filter which is tuned to a selected frequency or range of frequencies of oscillation, whereby vibrations of such selected frequencies are isolated and their transmission from the driving member to the driven member is effectively prevented.

Another object is to provide a simple and efficient rotary power transmitting device including a reduction gear coupling which permits oscillation of the driving member at a given frequency or frequencies with no variation in the force or torque delivered to the driven member.

Still another object is to provide a power transmitting device embodying the foregoing features, which is simple in construction, extremely durable and reliable in operation, and is particularly characterized by its lightness and compactness and its general adaptability for use in airplane power plants.

Various other objects and advantages will be apparent as the nature of the invention is more fully disclosed.

It is a well known practice to employ spring drives or quill shafts in power transmitting systems, for example between the crankshaft and propeller of an airplane, to reduce the transmission of vibration, and various other resilient couplings have also been proposed for this purpose. However, particularly in handling of large torques in aircraft engines where weight and space considerations are of major importance, the provision of sufficient flexibility by such ordinary means to prevent excessive transmission of vibration to the driven member becomes extremely difficult and may be accomplished only at the cost of very large, if not prohibitive, weight and space requirements for the springs or other resilient members and their associated parts.

My invention avoids the foregoing disadvantages of the prior art, and at the same time makes it possible to isolate or eliminate deleterious vibrations of the type referred to, in a manner much more effective than has heretofore been thought possible. I accomplish this by means whereby the stiffness of a spring drive or other resilient power transmitting device such as rubber or compressed air, can be, in effect, very much reduced over a selected range of frequencies of oscillation and at a particular predetermined frequency the effective stiffness can be reduced to zero. By this means a relatively compact, stiff spring or other resilient device can be caused to provide the characteristics and effects of a much larger and more flexible resilient device at certain frequencies of oscillation of the driving member.

Considering, for example, the case of a spring drive between the crankshaft and propeller of an airplane, in which the drive takes the form of a spring mounting for the nominally fixed gear of the reduction mechanism, an added mass appears in the system, that is, the mass of the fixed gear itself. It is evident that deflection in the springs which restrain the fixed gear will be accompanied by an inertia force due to the mass of the fixed gear. This inertia force will necessarily be opposite in direction and will therefore subtract from the spring force. Furthermore, the inertia force will depend upon the frequency of deflection or oscillation while the spring rate is independent of frequency and remains constant. This circumstance provides a resilient member, the effective rate or stiffness of which decreases as the frequency of oscillation increases. Therefore, at some frequency the spring force will be exactly balanced by the inertia force and under this condition no vibration can be transmitted between the crankshaft and the propeller. In applying the invention to this type of propeller drive, as hereinafter more fully described, the spring stiffness and fixed gear mass are so proportioned that the frequency of zero transmission will coincide with a frequency which tests have shown to be particularly obnoxious to the propeller. By isolating such frequency, certain problems heretofore confronted in propeller vibration are eliminated.

While my invention is applicable to power transmitting devices employing many different types of resilient drives, such as mechanical springs, rubber, compressed air, etc., I shall illustrate it in its particular application to coil spring drives. A preferred embodiment illustrated herein is a planetary reduction gear train in which the fixed orbit or ring gear is resiliently mounted and the inertia of this gear and the spring rate of the resilient mounting are so selected as to afford an attenuating action for a selected torsional vibration transmitted through the gear. Another embodiment hereinafter described utilizes a pair of disks or cam plates with free rollers or balls included between the disks in registering notches or races formed in the two opposed disks. The disks are urged toward each other by compression springs to apply pressure to the rollers and the inertia of the disks and the spring rate of the springs are selected to provide a vibration reducing effect for a selected torsional vibration in the manner described above.

Although the novel features which are characteristic of this invention are set forth more in detail in the claims appended hereto, the nature and scope of the invention may be better understood by referring to the following description, taken in connection with the accompanying drawing forming a part thereof, in which a specific embodiment has been set forth for purposes of illustration.

In the drawing:

Figures 1 and 2 are diagrammatic views illustrating two different linkages for transmitting vibrationless force in accordance with the present invention;

Fig. 3 is a vertical sectional view through the reduction gearing of a propeller driving mechanism, and illustrates the application of the invention to a rotating or torque transmitting system;

Fig. 4 is a fragmentary sectional view taken on line 4—4 of Fig. 3;

Fig. 5 is a perspective view showing a detail of the torsional vibration-reducing means of Figs. 3 and 4;

Fig. 6 is a detail sectional view taken on the line 6—6 of Fig. 4; and

Fig. 7 is a plan view, partly in section, showing another torque transmitting device embodying the invention.

In the following description certain specific terms are used for convenience in referring to the various details of the invention. These terms, however, are to be interpreted as broadly as the state of the art will permit.

Referring first to the force transmitting system of Fig. 1, the part 10 is a driving member having a motion or displacement in the nature of a steady deflection or low frequency oscillation which is to be transmitted to the driven member 12 through lever 13.

In addition to the motion mentioned above, let it be assumed that the driving member 10 also has an undesirable vibration or oscillation of relatively high frequency which preferably should not be transmitted to the driven member 12. In such case, the use of a resilient member 14 (for example a spring) as support for the fulcrum of lever 13 may serve to some extent to reduce the transmission of this undesirable vibration to the driven member 12. However, the degree of flexibility permissible in the spring 14 without impairing the useful functioning of the linkage may be severely limited, particularly if a control system of some kind is involved where a positive displacement must be transmitted. In order for member 10 to vibrate without a corresponding motion of member 12 it is necessary for spring 14 to be deflected and this deflection must be accompanied by a corresponding alternating force on member 12 of a magnitude which depends on the proportions of the lever 13 and the stiffness of spring 14.

The present invention resides in the addition of a mass 15, as shown in Fig. 1, of suitable size to so modify the net force acting on the fulcrum of lever 13 that the transmission of motion or force to driven member 12 due to oscillation of driving member 10 at certain undesirable frequencies may be reduced to a small fraction of that which would occur if said mass 15 were not present or were not of the correct size.

The net reaction at the fulcrum of lever 13 in Fig. 1 is a result of the force exerted by spring 14 and the force due to inertia of mass 15. When an oscillation of the fulcrum about a mean position occurs the corresponding oscillatory force due to spring 14 is always directed toward the mean position. The inertia force of mass 15 at any given frequency of oscillation is always directed away from the mid position. The resultant reaction on the fulcrum is the numerical difference of these two forces. The force due to mass 15 always subtracts from the spring force, giving an "apparent" spring rate which is lower than the actual spring rate by an amount depending on the size of mass 15 and the frequency of oscillation. Accordingly, at some frequency or range of frequencies of oscillation the "apparent" spring restraint on the fulcrum will be zero and the driving member 10 may oscillate freely at this frequency without transmitting any motion or force to the driven member 12.

It is apparent that in the application of the foregoing device to a particular design a sufficiently stiff spring or other resilient member 14 may be selected to insure positive action of the linkage for a steady displacement or a low frequency oscillation, and by suitable selection of the size of mass 15 the "apparent" or effective stiffness of the restraint may be reduced to a very low value or to zero corresponding with some relatively high frequency at which it is desirable to avoid transmission of motion or force to the driven member 12.

Fig. 2 shows a different linkage to which the invention may be applied in the manner described above. It will also be evident that numerous other linkages may be employed. Furthermore, the driving and driven members in Figs. 1 and 2 may be reversed in position.

Figs. 3 to 6 illustrate the invention in its application to a rotating or torque transmitting system, specifically a gear reduction mechanism for connecting the crankshaft of an airplane engine to the propeller shaft. As shown in Fig. 3, the reduction gear mechanism is contained in a housing 17 and consists of driving gear 18 splined on the forward end of crankshaft 19, planet gears 20 carried by axles 21 on the propeller shaft 22, and an orbit or ring gear 23 which meshes with planet gears 20 and is resiliently restrained from rotation by the housing 17 through a resilient means such as springs 24 acting on buttons 25 which serve as seats for said springs as best shown in Figs. 4 and 6.

The crankshaft 19 is normally subject to non-uniform rate of rotation or torsional oscillation due to power impulses from the firing of the engine cylinders. In practice it has been found that such torsional oscillation of the crankshaft is generally transmitted through the reduction gearing to the propeller, leading to vibration and, in many cases, excessive stresses in the propeller blades. In order to reduce the transmission of such vibration to the propeller, it has been proposed in the past to introduce a spring drive or other resilient connection in the driving means. When carried out in the ordinary manner, however, the introduction of springs of sufficient flexibility to accomplish the purpose, and sufficient strength to carry the large torque involved, usually results in springs and associated parts of prohibitive size and weight.

In the application of the present invention to the foregoing problem, the desired result may be obtained by a resilient restraint on the ring gear 23 with a suitable relation between the resilient rate of the restraint and the mass moment of inertia of the ring gear and certain associated parts. In order for the crankshaft 19 to vibrate without vibratory motion of the pinion axles 21 and propeller shaft 22 it is necessary for the ring gear 23 to oscillate. The resultant reaction set up at the ring gear due to oscillation is a combination of the torque due to deflection of the springs or other resilient means 24 and torque due to the inertia of the ring gear 23 and associated parts. As shown in the foregoing description of Fig. 1, the spring reaction and the inertia reaction are always in opposite directions and the resultant ring gear reaction torque due to oscillation is therefore equal to the numerical difference of these two forces.

Accordingly, it is evident that the effective stiffness of the restraint on the ring gear 23 will decrease as the frequency of oscillation is increased, and when the numerical difference between the spring reaction and the inertia reaction is equal to zero no reaction torque is present at the ring gear so that the driving member or crankshaft 19 may vibrate freely without transmission of any oscillating motion or torque to the propeller shaft 22. The frequency at which this condition is attained is controlled by the designer in the selection of the two values mentioned, namely, the torsional spring rate of the springs 24 and the mass moment of inertia of the ring gear 23 and associated parts.

The associated parts just mentioned include the buttons 25 which hold the springs 24 in effective position. The heads of the buttons engage bosses 40 integral with the housing 17 and projecting inward, and pairs of bosses 41 projecting from the periphery of the orbit or ring gear 23. The bosses 41 of each pair are spaced apart sufficiently to span one of the bosses 40 (see Figs. 3 and 6). The facing edges of the bosses 40 and 41 are arcuately shaped to form seats for the heads of the buttons 25. In operation the bosses 41 on the orbit gear are movable relative to the stationary bosses 40 by vibrations or oscillations transmitted through the ring gear by the driving shaft 19, the springs 24 thus acting between the movable bosses and the stationary bosses to absorb or neutralize the vibrations or oscillations before they can adversely affect the propeller shaft 22.

It will be noted from Figs. 4 and 5 that the surfaces of the buttons 25 engaging the bosses 40 and 41 are cylindrical in shape, this shape permitting the buttons to accommodate themselves to different possible relative positions of the bosses 40 and 41 which may exist during the operation of the device.

By the use of the combination disclosed in Figs. 3 to 6 a relatively compact and stiff spring may be used to obtain a degree of flexibility ordinarily obtainable only by a large and very heavy spring. This increased flexibility extends over a considerable range of frequencies, controlled by the designer in his selection of the actual spring stiffness and the mass moment of inertia of the ring gear and associated parts, and at a particular frequency the flexibility becomes infinite. In the calculation of the mass moment of inertia there should be included all parts which move with the ring gear 23, such as half the buttons 25, approximately one-third of the mass of the springs 24, and one-half the moment of inertia of the planet gears 20 corrected by the square of the ratio of number of teeth in the ring gear to the number of teeth in a planet gear. It should be noted that in the use of this device, either in translation or transmission or torque, another degree of freedom is added to the system and hence a new natural frequency is present. This new natural frequency is always well above the frequency of zero effective stiffness and ordinarily will occur above the normal operating range of frequencies.

In the modification of the invention shown in Fig. 7 the cam plate or disk 30 on shaft 31 is the driving member, and disk 32 on shaft 33 is the driven member. Disk 32 carries another cam plate or disk 34 on pins 35, and disk 34 may slide freely on these pins 35 in an axial direction. The springs 36 surrounding pins 35 exert a pressure on disk 34 in a direction to urge disk 34 toward the driving member 30. The disk 34 is restrained in its axial movement by contact with balls 37 which, in turn, rest against the driving member 30 and are set into registering shallow curved races 38 in one or both of the disks 30 and 34 as shown.

In the transmission of torque the construction of Fig. 7 affords a resilient drive since a limited angular motion of disk 30 relative to disk 34 may occur by rolling of the balls in the races, accompanied by axial motion of disk 34 away from disk 30 due to the shape of the races. This axial motion of disk 34 is resisted by the springs 36 and a torque between disks 30 and 34 results, depending in magnitude on the shape of the races 38, the stiffness of the springs 36, and the amount of angular rotation between the driving member 30 and the disk 34 which is angularly fixed to the driven member 32. When angular oscillation occurs between the driving member 30 and the driven member 32 a corresponding axial motion of disk 34 must occur. This not only sets up a varying force in springs 36 but also an inertia force due to axial oscillation of the mass of the disk 34. As demonstrated above in connection with the other embodiments of the invention, the inertia force is always opposite in direction to the spring force and the "apparent" restraint on axial motion of disk 34 will decrease as the frequency is increased, there being a frequency at which the inertia force is exactly equal and opposite to the spring force and at which there is no restraint on axial motion of disk 34 under the action of the balls 37. At this frequency the driving member 30 may vibrate freely without transmission of any oscillating motion or torque to the driven member 32.

Although certain specific embodiments of the invention have been shown for purposes of illustration it is to be understood that the invention is capable of various modifications and adaptations which will be readily apparent to a person skilled in the art. The invention is only to be limited in accordance with the scope of the appended claims.

What is claimed is:

1. In an apparatus of the class described, a driving shaft, a driven shaft, a driving gear on the driving shaft, planetary gears on the driven shaft meshing with the driving gear, an internally toothed ring gear meshing with said planetary gears, a housing surrounding said ring gear, a series of inwardly extending bosses on said housing, a series of projections on said ring gear extending outwardly into cooperative relation with the bosses on the housing and radially aligned with said bosses to form a plurality of sets of said projections and bosses, and a plurality of vibration absorbing springs, each end of each of said springs being arranged to bear against one of said sets of projections and bosses, whereby all said springs are compressed by any relative movement about the axis of said ring gear and said housing in either direction.

2. Apparatus of the class described according to claim 1, wherein there is interposed between each end of each of said springs and one of said sets of projections and bosses a spring abutment button having a part cylindrical bearing surface engaging correspondingly shaped bearing portions on said projections and bosses respectively.

GEORGE L. WILLIAMS.

REFERENCES CITED

The following references are of record in the file of this patent:

UNITED STATES PATENTS

| Number | Name | Date |
|---|---|---|
| 1,218,236 | Backscheider | Mar. 6, 1917 |
| 1,527,335 | Uppercu | Feb. 24, 1925 |
| 1,586,309 | Hulf | May 25, 1926 |
| 1,864,256 | Nardone | June 21, 1932 |
| 1,923,368 | Goldschmidt | Aug. 22, 1932 |
| 1,946,956 | Waseige | Feb. 13, 1934 |
| 2,027,666 | Bedford | Jan. 14, 1936 |
| 2,233,498 | Taylor | Mar. 4, 1941 |
| 2,247,839 | Halford | July 1, 1941 |
| 2,255,717 | Tyler | Sept. 9, 1941 |

FOREIGN PATENTS

| Number | Country | Date |
|---|---|---|
| 263,152 | Italy | Mar. 7, 1929 |